United States Patent [19]

Hewitt et al.

[11] 4,037,693

[45] July 26, 1977

[54] MOTOR VEHICLE DRIVE SYSTEM

[75] Inventors: Roger John Arthur Hewitt, Abingdon; Nigel Terence Cross, Sheffield, both of England

[73] Assignee: GKN Transmissions Limited, Birmingham, England

[21] Appl. No.: 595,991

[22] Filed: July 14, 1975

Related U.S. Application Data

[63] Continuation of Ser. No. 419,982, Nov. 29, 1973, abandoned.

[30] Foreign Application Priority Data

Nov. 29, 1972 United Kingdom ............... 55199/72

[51] Int. Cl.² .................... B60K 41/22; F16H 37/00
[52] U.S. Cl. ...................................... 192/3.56; 74/740
[58] Field of Search ............ 192/3.51, 3.52, 3.53, 192/3.54, 3.55, 3.57, 3.58, 3.61, 3.62, 3.63, 3.64; 74/740, 750 R, 751, 781 R

[56] References Cited

U.S. PATENT DOCUMENTS

| | | | |
|---|---|---|---|
| 2,131,263 | 9/1938 | Barnes | 192/3.52 |
| 2,194,823 | 3/1940 | Dooley | 74/781 R |
| 3,313,182 | 4/1967 | Nallinger | 74/740 |
| 3,367,213 | 2/1968 | Abbot | 74/740 |
| Re. 23,691 | 7/1953 | Randol | 192/3.63 |

FOREIGN PATENT DOCUMENTS 781,944  8/1957  United Kingdom ................ 192/3.52

*Primary Examiner*—Samuel Scott
*Assistant Examiner*—Lance W. Chandler
*Attorney, Agent, or Firm*—Spencer & Kaye

[57] ABSTRACT

The combination in a motor vehicle of a prime mover, a multi-speed main gearing provided with manual ratio selector means, a disengageable main clutch between the prime mover and the input of the main gearing, a driver-operated main clutch control having a first position in which the main clutch is engaged to transmit drive from the prime mover to the main gearing and a second position in which the main clutch is disengaged and which is normally assumed during ratio changes of said main gearing by said selector means, an auxiliary two-ratio gearing in series with the main gearing, and ratio control means for the auxiliary gearing connected with the main clutch control and manual selector means so that, with the main gearing in its highest ratio, each movement of the main clutch control to its second position not only disengages the clutch but also actuates the ratio control means to change the operative ratio of the auxiliary gearing.

7 Claims, 4 Drawing Figures

MOTOR VEHICLE DRIVE SYSTEM

CROSS REFERENCE TO RELATED APPLICATION

This application is a continuation of application Ser. No. 419,982 filed Nov. 29, 1973 now abandoned.

BACKGROUND OF THE INVENTION

This invention relates to motor vehicle drive systems. More particularly, the invention relates to the combination, hereinafter referred to as being of the kind specified, in a motor vehicle of a prime mover, a multi-speed main gearing arranged for manual ratio-changing operation, a disengageable main clutch between the prime mover and the input of the main gearing, a driver-operated main clutch control, normally a clutch pedal, and an auxiliary two-ratio gearing in series with the main gearing. Normally, the auxiliary gearing will be operated hydraulically but other forms of operation such as by pneumatic means or vacuum may be employed.

Combinations of the kind specified as already known, the auxiliary gearing normally being arranged to provide, in its higher ratio, an overall overdrive ratio.

Heretofore, the control of the auxiliary gearing has entailed a manual operation of a selector member or some over-travel movement on one of the foot operated controls of the vehicle such as the clutch pedal.

In particular, the invention has particular utility when the auxiliary gearing is of the epicyclic type in which the ratios are engaged by friction clutch means. Heretofore, such auxiliary gearings have been arranged so as to change ratio while drive is being transmitted to them and this has meant that the gears and clutches have had to be relatively large and in many smaller cars there is insufficient space to mount an auxiliary gearing of this type of conventional size.

It is an object of the invention to provide a combination of the kind specified which is applicable to smaller vehicles where the space is limited.

SUMMARY OF THE INVENTION

According to the invention we provide the combination in a motor vehicle of a prime mover, a multi-speed main gearing provided with manual ratio selector means, a disengageable main clutch between the prime mover and the input of the main gearing, a driver-operated main clutch control having a first position in which the main clutch is engaged to transit drive from the prime mover to the main gearing and a second position in which the main clutch is disengaged and which is normally assumed during ratio changes of said main gearing by said selector means, an auxiliary two-ratio gearing in series with the main gearing, and ratio control means for the auxiliary gearing connected with the main clutch control and manual selector means so that, with the main gearing in its highest ratio, each movement of the main clutch control to its second position not only disengages the clutch but also actuates the ratio control means to change the operative ratio of the auxiliary gearing.

Assuming that the main gearing is a four speed gearing then, when the top or fourth gear is engaged, a subsequent position is arranged to actuate the ratio control means thus changing the operative ratio of the auxiliary gearing. Subsequent movement of the main clutch control will again change the operative ratio of the auxiliary gearing as long as the main gearing remains in top gear.

Normally, the auxiliary gearing will be arranged to provide direct drive and overdrive ratios. The ratio control means will be arranged so that when the highest speed ratio of the main gearing is first engaged the auxiliary gearing will be in its direct drive ratio. Subsequent movement of the main clutch control to its second position will change the operative ratio of the auxiliary gearing to its overdrive ratio and a further movement of the main clutch control to its second position will change the auxiliary gearing back to its direct drive ratio.

In an alternative arrangement, the auxiliary gearing could be arranged to provide direct drive and underdrive ratios. In such an arrangement the ratio control means will be arranged to ensure that the underdrive ratio is engaged when the highest speed ratio of the main gearing is first engaged and a subsequent movement of the main clutch control changes the operative ratio of the auxiliary gearing to the direct drive ratio and thus raises the overall speed ratio of the two gearings in series.

Preferably, the auxiliary gearing is of the epicyclic type comprising gear elements in the form of a sun gear, at least one planet gear carried on a planet carrier, and an annulus gear. In such gearing, locking together of two elements thereof will give a direct drive ratio and the holding stationary of one of the elements, normally the sun gear, will give the overdrive or underdrive ratio as required. The sun gear is normally held stationary by locking it to a casing provided for the auxiliary gearing.

Preferably, the ratio control means include a hydraulically operated friction clutch arranged to lock said one gear element to the casing and a further clutch arranged to lock together said two gear elements in order to give the direct drive ratio. Normally cone clutches are used for this application.

Epicyclic auxiliary gearing utilizing friction or cone clutches to hold one of the gear elements stationary and to lock together two of the gear elements is itself well known but as mentioned above, it has, heretofore, been manufactured in such a manner that the friction or cone clutches are capable of engaging while drive is being passed through the auxiliary gearing. Since, in a combination embodying the invention, the main clutch is disengaged while the ratio change of the auxiliary gearing is taking place, the friction or cone clutches can be made much smaller than in auxiliary gearing of similar principle heretofore used. The overall size of the auxiliary gearing of this type is governed by the size of the cone clutches. It will be appreciated therefore, that by interrupting the drive through the auxiliary gearing while the ratio thereof is being changed, the size of the cone clutches can be reduced and therefore the size of the auxiliary gearing as a whole can be reduced and therefore such gearing can be fitted to cars where there is insufficient space available to fit conventional gearing of this type designed to change ratio while drive is being transmitted.

Preferably the ratio control means includes a hydraulic piston and cylinder assembly arranged, when operative, to clutch said one gear element to the casing. The ratio control means may also include a bias member arranged to ensure that the said further clutch is operative to lock together said two gear elements when said piston and cylinder assembly is not operative.

In one arrangement the ratio control means includes a pump which continuously pumps hydraulic fluid around a circuit including the piston and cylinder assembly, the circuit being provided with an outlet arranged to be blocked when it is desired to engage the overdrive or underdrive ratio of the auxiliary gearing thus pressurizing the piston and cylinder assembly and hence clutching said one gear element to the casing.

In such an arrangement the ratio control means may include an electrically operated valve which controls the outlet of the hydraulic circuit, the operation of the electrically operated valve being in turn controlled by a relay, the relay being arranged to be activated, and hence the electrically operated valve closed, on the first movement of the main clutch control to its second position after the highest ratio of the main gearing has been engaged, the relay being de-activated, and hence the electrically operated valve opened, on a subsequent movement of the main clutch control to its second position.

The ratio control means may also include an electrical circuit which includes the relay and which is supplied with power via a first switch connected with the manual ratio selector means, said first switch being arranged to be closed only when the highest ratio of the main gearing is selected, the circuit also including a second and double-pole switch connected with the main clutch control, one part of the double-pole switch being arranged, when the main clutch control is moved to its second position and the first switch is closed, to momentarily connect the relay to the power supply thereby activating the electrically operated valve, the circuit also including a holding sub-circuit arranged to maintain the relay activated following such a momentary connection to the power supply until the relay is deactivated, through the other part of the double pole switch and a third switch which is only closed when the hydraulic circuit is pressurized, on the subsequent movement of the main clutch control to its second position.

The hydraulic circuit is made so as to have a minimum of restriction to the build up of fluid pressure so as to change ratio as rapidly as possible. Also the decay of pressure on rechanging ratio should be as rapid as possible.

Although the main advantage of the invention is obtained when using auxiliary gearing of the type mentioned above in which change of ratio is effected by disengaging one friction clutch and engaging another, the invention can also be used with auxiliary gearing of the epicyclic type in which ratio is changed by sliding a toothed coupling sleeve so that in one position the coupling sleeve locks the reaction member of the gearing to the casing and in another position the coupling sleeve interconnects two elements of epicyclic gearing. Synchronizing means will be provided to facilitate the engagement of the teeth on the coupling with the housing and the gearing element.

The invention also provides a combination in which the ratio control means includes a first sensing means arranged to sense when the highest ratio of the main gearing is selected, a second sensing means arranged to sense when the main clutch control is moved to its second position, and a bi-stable switching device which is arranged when in one condition to initiate engagement of direct drive and in the other condition to initiate engagement of overdrive or underdrive, the bi-stable switching device being arranged to be changed from one condition to the other whenever the second sensing device senses that the main clutch control is moved to its second position and the first sensing device simultaneously senses that the highest ratio of the main gearing has already been selected.

In one combination the ratio control means may include an electrical circuit including a first switch which is connected with the manual ratio selector means and arranged to sense when the highest ratio of the main gearing is selected, a second switch connected with the clutch control and arranged to sense when the main clutch control is moved to its second position, and a bi-stable switching device which is arranged when in one condition to initiate engagement of direct drive and in the other condition to initiate engagement of overdrive or underdrive, the bi-stable switching device being arranged to be changed from one condition to the other whenever the second switch senses that the main clutch is moved to its second position and the first switch simultaneously senses that the highest ratio of the main gearing has already been selected.

The invention also provides a combination as described in the preceding paragraph in which power is supplied to the circuit via the first switch which is closed only when the highest ratio of the main gearing is selected, the bi-stable switching device comprises a relay, the second switch is a double-pole switch one part of which is arranged to momentarily connect the relay to the power supply when the main clutch control is moved to its second position and the first switch is also closed thus activating the relay and initiating engagement of the higher ratio of the auxiliary gearing, and the circuit also includes a holding sub-circuit arranged to maintain the relay activated following such a momentary connection to the power supply unit the relay is de-activated through part of the circuit including the other part of the double-pole switch on a subsequent movement of the main clutch control to its second position thereby engaging the lower ratio of the auxiliary gearing.

The invention also includes within its scope a motor vehicle including any of the combinations described above.

BRIEF DESCRIPTION OF THE DRAWINGS

The invention will now be described in detail by way of example with reference to the accompanying drawings in which.

DESCRIPTION OF A PREFERRED EMBODIMENT

Figure 1:
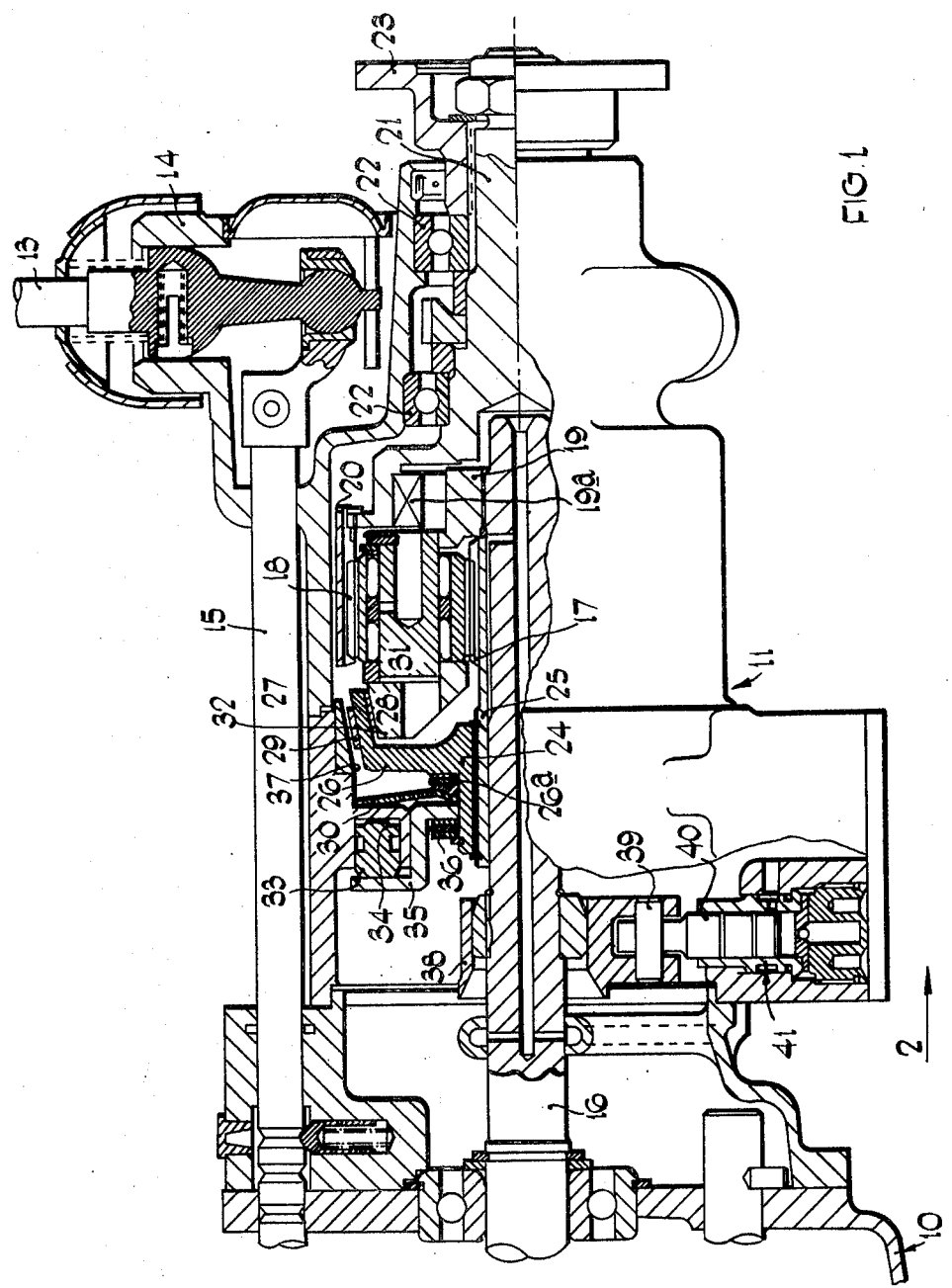
FIG. 1 is a vertical longitudinal section through the auxiliary gearing of a combination of the kind specified embodying the invention and showing part of the casing of the main gearing.

Referring now to the drawings, the main gearing is indicated generally at 10 and the casing of the auxiliary gearing at 11. The ratios in the main gearing are selected by means of a gear change lever 13 which is suitably mounted in a bearing 14 and is connected to a selector rail 15 which in turn is connected to selectors, not shown, in the main gearing 10. The bearing 14 is conveniently provided in part of the casing 11 of the auxiliary gearing as shown.

The tail shaft of the main gearing is indicated at 16 and projects into the casing 11 of the auxiliary gearing. The auxiliary gearing is of the epicyclic type and is of generally known construction so that it will only be described briefly. A sun gear 17 provided with a sleeve 25 is freely rotatable on the tail shaft 16 and meshes with planet gears 18 which are mounted on a planet carrier 19 which is splined to the tail shaft 16. In turn, the planet gears mesh with an annulus gear 20 which is connected to an output shaft 21 mounted in bearings 22 at the right hand end of the housing 11. The shaft 21 carries a flange coupling 23 which is intended to be connected to a propeller shaft and thus to the final drive of the vehicle. A free-wheel 19a is connected between the planet carrier 19 and the annulus gear 20 so that the planet carrier can drive the annulus gear when the epicyclic gearing is in direct drive ratio as described below but so that the annulus gear can over-run the planet carrier when the gearing is in overdrive ratio.

An operating sleeve 24 is splined to the sun gear sleeve 25 and is prevented from moving axially relative thereto. The sleeve 24 has a radial flange 26 and a generally axial flange 27. The flange 27 is inclined to the rotary axis of the sleeve 24 and carries on its inner and outer surfaces friction linings 28 and 29. The sleeve 24 and thus the flanges 26 and 27 are urged to the right in FIG. 1 by means of a Belleville spring washer 30 which engages a thrust bearing 26a abutting the flange 27 so as to bring the friction lining 28 into engagement with a frusto-conical face 31 on an annular collar 32 secured to the planet carrier. The sleeve 24 and the sun gear 17, 25 may be moved to the left against the reaction of the spring 30 by means of an annular piston 33 received in an annular cylinder 34 formed in the housing 11. The piston 33 engages a Z-shaped annular member 35 which can move the sleeve 24 and sun gear 17, 25 to the left through a thrust bearing 36. When the sleeve 24 and sun gear are moved to the left, the friction lining 29 comes into engagement with a bearing surface 37 on the housing 11 and the friction lining 28 is disengaged from the face 31.

Figure 2:
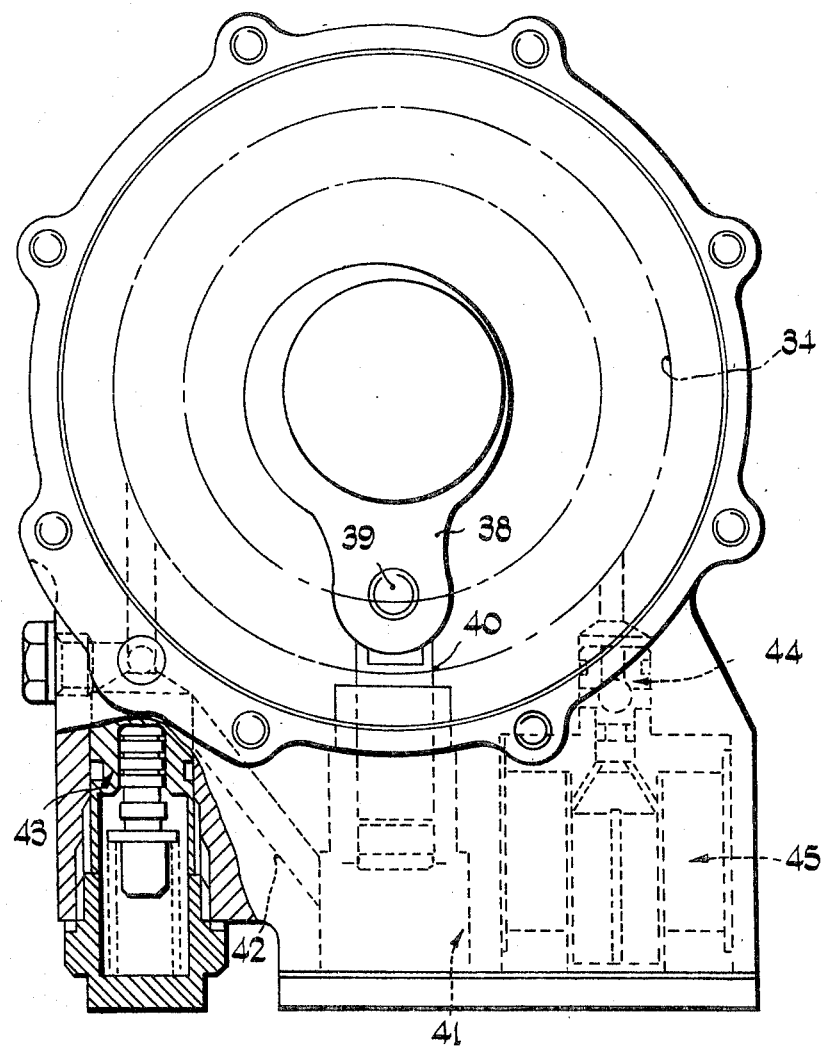
FIG. 2 is a view in the direction of the arrow 2 in FIG. 1 of the left hand end of the casing of the auxiliary gearing.

The tail shaft 16 carries an eccentric 38 which is connected by a pin 39 to the piston 40 of an oil pump indicated generally at 41. The pump is arranged to deliver oil along a passage 42 (see FIG. 2) and through a relief valve indicated generally at 43 into the annular cylinder 34. Also connected to the annular cylinder 34 is a valve 44 which is biased to a normally open position but which may be moved to a closed position by means of a solenoid 45.

The circuit for operating the solenoid 45 will now be described with reference to FIG. 3. Referring to this figure, the live line is indicated at 46 and is connected through a gear box switch 47 to the terminal C2 of a relay indicated generally at 48. The terminal C2 is connected to the armature 49 of the relay which has connected thereto a blade 50 having two contacts 51 and 52. When the relay is de-energized the contacts are in the positions shown in - FIG. 3. One end of the relay coil 53 is connected to the terminal W2 and the other end of the relay coil is connected to the terminal W1 and through a ballast resistor 54 to earth. There are two fixed contacts 55 and 56 respectively which can make with the contacts 52 and 51 respectively when the coil 53 is energized. The contact 55 is connected to the terminal C4 and the contact 56 is connected to the terminal C1.

The terminal C1 is connected by a line 57 to one end of the solenoid 45. The other end of the solenoid is grounded. A line 58 interconnects the terminals W2 and C4 and connects these terminals to one side of one part 59 of a double pole switch 60. The other side of the switch part 59 is connected by a line 61 to the terminal C2 and this line 61 is also connected to one side of the gear box switch 47. The line 58 is also connected to one side of the other part 62 of the switch 60. The other side of the part 62 is connected by means of a line 63 through a pressure switch 64 to the terminal W1. The pressure switch 64 is arranged to sense the pressure in the annular cylinder 34 and is normally open when the cylinder is unpressurized. When the valve 44 closes, as will be described below and pressure builds up in the cylinder 34 then the switch 64 will close. A warning light 65 is connected between the line 58 and earth.

The gearbox switch 47 is a normally open switch which is closed only when the highest ratio or top gear is engaged in the main gearng 10. The switch may be operated from any concentration part of the main gearing for example from the selector rail 15 or from one of the selectors or any other convenient part. The double pole switch 60 is normally open switch which is pulsed when the clutch pedal is depressed sufficiently to allow the ratio of the main gearing to be changed. Conveniently, therefore, the switch 60 will be arranged to be operated at a position between half and two thirds of the full travel of the clutch pedal from its rest position. The position of the switch 60 must be such as to ensure that it cannot be operated without the main clutch having been substantially disengaged by movement of the clutch pedal.

The operation of the combination will now be described. If the highest speed ratio of the main gearing is not engaged then the parts will be in the positions shown in the figures. Thus the sleeve 25 and the sun gear 17 will be clutched to the planet carrier 19 through engagement of the friction lining 28 and the face 31 so that there will be a direct drive through the auxiliary gearing and so that the shafts 16 and 21 will rotate at the same speed. The main drive path will be through the free wheel 19a. The switch 47 will be open.

If now it is desired to select the highest speed ratio of the main gearing the clutch pedal is depressed thus pulsing the switch 60. At the instant the switch 60 closes the gear box switch 47 will not be closed and thus the electrical circuit shown in FIG. 3 is not activated. Following the depression of the clutch pedal the gear selector rail 15 is moved to select top gear in the main gearing and the clutch is released to re-engage drive. With the main gearing in top gear the switch 47 is closed, the valve 44 is open as the solenoid 45 is de-energized and, since there is no pressure in the cylinder 34, the pressure switch 64 is open.

If now the main clutch is disengaged, the switch parts 59 and 62 will momentarily close. Closing of the switch part 59 will connect the live line 61 with the terminal W2 which will thus energize the relay. The contacts 51 and 56 and the contacts 52 and 55 will thus make. There is a holding circuit for the relay from the terminal C2 through the armature 49, the contacts 52 and 55, the terminal C4, the terminal W2 and the coil of the relay back to earth through the ballast resistor 54. The relay will thus remain energized even though the switch 60 has only been pulsed. The closing of the contacts 51 and 56 will also connect the live line 61 through the armature 49 and the contacts 51 and 56 to the terminal C1 and thus to the line 57 to operate the solenoid 45 to close the valve 44. Upon closing of the valve 44, pressure builds up on the cylinder 34 until the relief valve 43 blows off. The pressure in the cylinder is sufficient to move the piston 33 to the left as described above thus disengaging the friction lining 28 from the face 31 and engaging the friction lining 29 with the face 37 thus locking the sleeves 24 and 25 and the sun gear 17 to the casing 11. The gear will now operate in overdrive ratio and the shaft 21 will rotate at a higher speed than the shaft 16, this is permitted by the free wheel 19a. The hydraulic circuit will be arranged so that the required build up of pressure in the cylinder 34 is as rapid as possible and therefore no restrictions are provided in the hydraulic circuit.

It will be seen that as the change of ratio of the auxiliary gear takes place the main clutch is disengaged because the change of ratio of the auxiliary gear is effected by pulsing the double pole switch 60 and this pulsing is effected by operating the clutch pedal to disengage the main clutch. As has been explained above, therefore, the size of the friction clutches constituted by the flange 27 with its friction linings 28 and 29 and the faces 31 and 37 can be smaller than in conventional auxiliary gearing of this general type because it is not necessary that the cone clutches engage while drive is being transmitted. Since the size of the auxiliary gearing of this general type is governed by the size of the cone clutches the gearing can be considerably more compact than prior gearing of this type and therefore can be made to fit into the space available in smaller cars. In the example shown, the auxiliary gearing is located beneath the selector rail 15 of the single rail gear change system which is now popular, and the bearing for the gear shift lever itself is formed as part of the casing for the auxiliary gearing.

Returning now to the operation of the combination, when the switch 60 was pulsed to engage overdrive, the switch 64 was open because there was no pressure in the cylinder 34. When the cylinder 34 is pressurized to change the ratio of the auxiliary gearing, however, the pressure will cause the switch 64 to close. Upon the next operation of the clutch pedal which pulses the double pole switch 60, therefore, there will be a connection through the switch part 62 between the terminals W2 and W1 and this will have the effect of grounding the relay coil 53 through the ballast resistor 54 and thus causing de-energization of the relay. The contacts 51 and 56 will thus open and the solenoid 45 will be deenergized so that the valve 44 will open, the pressure in the cylinder 34 will decay and the sleeves 24 and 25 will return to the positions shown in FIG. 1 in which direct drive is obtained. The decay of pressure in the cylinder 34 will cause the switch 64 to open so that the circuit will return to the position shown in FIG. 3 except that the gear box switch 47 will still be closed. A further operation of the clutch pedal will change the auxiliary gearing to overdrive ratio as described above and so on.

The warning light 65 is arranged to be illuminated when the overdrive ratio is engaged as warning to the driver. The driver may, inadvertently, engage the overdrive ratio if he had considered changing down from the highest ratio in the main gearing, pressed the clutch pedal with the intention of effecting such a change and then decided not to change ratio.

Figure 3:
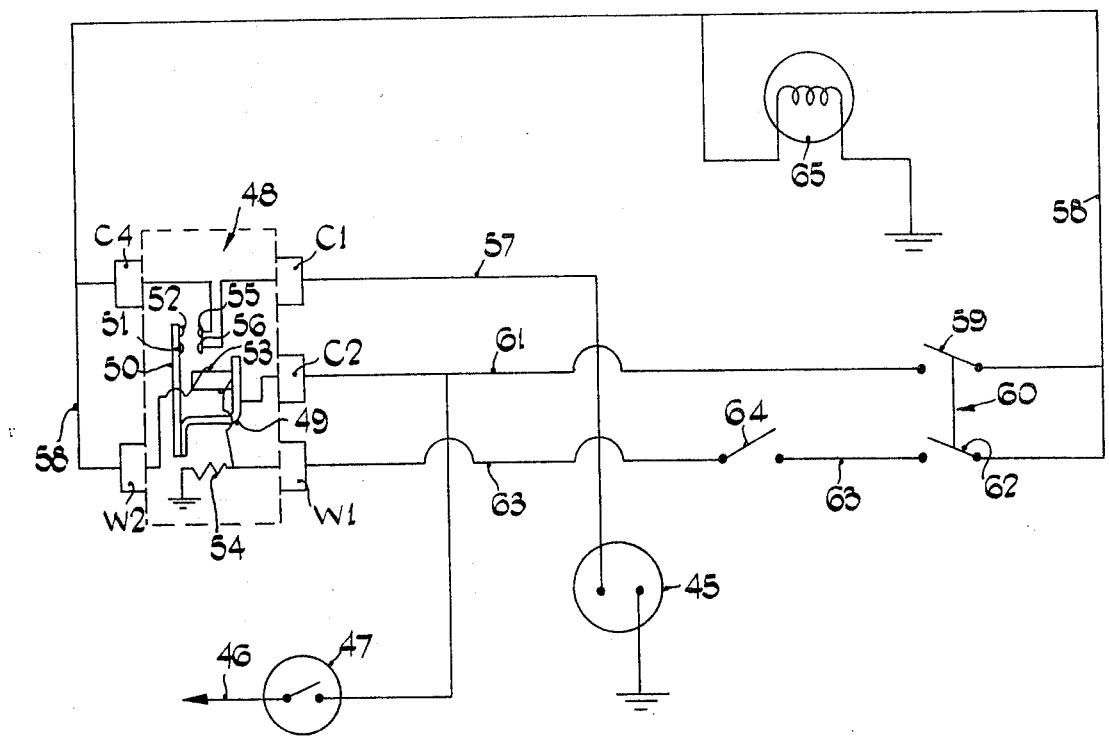
FIG. 3 is a diagram of the electrical control circuit for the combination.

If the driver wishes to change down to a lower gear in the main gearing, as he moves the gear lever the switch 47 will open which will deactivate the whole of the circuit shown in FIG. 3. It may be that when changing down to a lower gear in the main gearing initially the relay 48 will become energized as a first step to changing into overdrive ratio but since the clutch is disengaged this will not matter and as soon as the driver moves the gear lever the switch 47 will be opened and the whole circuit deactivated.

It will be seen that the invention provides a simple combination of the kind specified with simple and automatic ratio control means for the auxiliary gearing. Various modifications may be made to the arrangements specifically described. As mentioned above the auxiliary gearing may be arranged to give direct and underdrive ratios instead of direct and overdrive ratios and in this case the auxiliary gearing will normally be in its underdrive condition and will be changed to its direct drive position to give its overall ratio.

Although the invention is particularly advantageous when used with auxiliary gearings of the epicyclic, friction clutch type as described, the invention may also be used with auxiliary gearing using a toothed coupling which is slid to change the ratio of the auxiliary gearing.

Further, although the sensing of the selection of the highest ratio in the main gearing and the disengagement of the clutch is described above as being achieved electrically, this sensing may alternatively be achieved mechanically or by the use of hydraulic or pneumatic systems.

Figure 4:
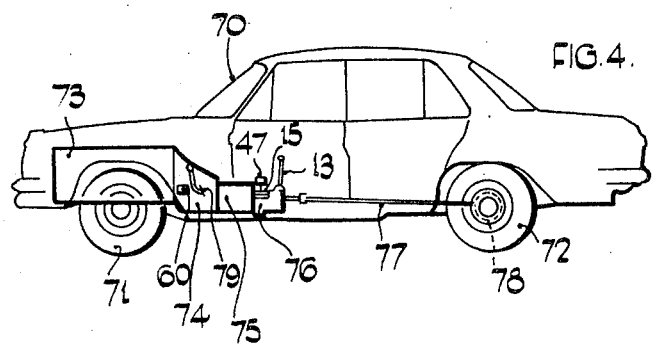
FIG. 4 is a schematic diagram of a vehicle provided with a combination of the kind specified embodying the invention.

In order to understand the manner in which the combination described in detail above may be applied to a vehicle reference should be made to FIG. 4 which shows in diagrammatic form a vehicle 70 provided with front and rear wheels 71 and 72. The rear wheels 72 of the vehicle are driven by a prime mover 73 through a main clutch 74, the main gearing 10, an auxiliary two speed gearing 76, a propellor shaft 77 and a differential unit 78. The main clutch 74 is operated by a foot pedal 79 which is arranged in turn to operate the double pole switch 60 in the manner described above. The main gearing 10 is controlled by the gear change lever 13 and selector rail 15. The selector rail is arranged in turn to close the switch 47 when the highest ratio of the main gearing is engaged as described above.

We claim:

1. The combination in a motor vehicle of a prime mover, a multi-speed main gearing provided with a manual ratio selector means movable from a neutral position to any one of a number of operative positions equal to the number of ratios available in said main gearing but having no other operative positions, a disengageable main clutch between the prime mover and the input to the main gearing, a driver operated main clutch control having a first position in which the main clutch is engaged to transmit drive from the prime mover to the main gearing and a second position in which the main clutch is disengaged and which is normally assumed during ratio changes of the main gearing by said selector means, an auxiliary two ratio gearing in series with the main gearing, and ratio control means for the auxiliary gearing operable in dependence solely on the positions of the main clutch control and the manual ratio selector means so that, whenever the main gearing is in its highest ratio, the only action required to change the operative ratio of the auxiliary gearing is the movement of the main clutch control to its second position, each said movement of the main clutch control to its second position actuating the ratio control means to change the operative ratio of the auxiliary gearing while simultaneously disengaging the main clutch.

2. A combination according to claim 1 in which the ratio control means is arranged to ensure that the auxiliary gearing is in its lower ratio each time the highest ratio of the main gearing is first engaged.

3. The combination in a motor vehicle of a prime mover; a multi-speed main gearing provided with a manual ratio selector means movable from a neutral position to any one of a number of operative positions equal to the number of ratios available in said main gearing but having no other operative positions; a disengageable main clutch between the prime mover and the input to the main gearing; a driver operated main clutch control having a first position in which the main clutch is engaged to transmit drive from the prime mover to the main gearing and a second position in which the main clutch is disengaged and which is normally assumed during ratio changes of the main gearing by said selector means; an auxiliary two ratio gearing in series with the main gearing, said auxiliary gearing being of the epicyclic type which provides a direct drive ratio and a planetary ratio; and ratio control means for the auxiliary gearing and operable in dependence solely on the positions of the main clutch control and the manual ratio selector means said ratio control means including (1) a hydraulic circuit having an outlet which is controlled by an electrically operated valve, said outlet being arranged when closed to pressurize said circuit thereby engaging the planetary ratio of the auxiliary gearing and (2) a relay arranged to control operation of the electrically operated valve, said relay being arranged to be activated, and hence the electrically operated valve closed, on the first movement of the main clutch control to its second position after the higest ratio of the main gearing has been engaged, the relay being deactivated, and hence the electrically operated valve opened, on subsequent movement of the main clutch to its second position, so that whenever the main gearing is in its highest ratio, the only action required to change the operative ratio of the auxiliary gearing is the movement of the main clutch control to its second position, each said movement of the main clutch control to its second position actuating the ratio control means to change the operative ratio of the auxiliary gearing while similtaneously disengaging the main clutch.

4. A combination according to claim 3 in which the ratio control means includes an electrical circuit which includes the relay and which is applied with power via a first switch connected with the manual ratio selector means, said first switch being arranged to be closed only when the highest ratio of the main gearing is selected, the electrical circuit also including a second and double-pole switch connected with the main clutch control, one part of the double-pole switch being arranged, when the main clutch control is moved to its second position and the first switch is closed, to momentarily connect the relay to the power supply thereby activating the electrically operated valve, the electrical circuit also including a holding sub-circuit arranged to maintain the relay activated following such a momentary connection to the power supply until the relay is deactivated, through the other part of the double-pole switch and a third switch which is only closed when the hydraulic circuit is pressurized, on the subsequent movement of the main clutch control to its second position.

5. The combination in a motor vehicle of a prime mover; a multi-speed main gearing provided with a manual ratio selector means movable from a neutral position to any one of a number of operative positions equal to the number of ratios available in said main gearing but having no other operative positions; a disengageable main clutch between the prime mover and the input to the main gearing; a driver operated main clutch control having a first position in which the main clutch is engaged to transmit drive from the prime mover to the main gearing and a second position in which the main clutch is disengaged and which is normally assumed during ratio changes of the main gearing by said selector means; an auxiliary two ratio gearing in series with the main gearing, and ratio control means for the auxiliary gearing and operable in dependence solely on the positions of the main clutch control and the manual ratio selector means, said ratio control means including (1) a first sensing means arranged to sense when the highest ratio of the main gearing is selected, (2) a second sensing means arranged to sense when the main clutch control is moved to its second position, and (3) a bi-stable switching device which is arranged when in one condition to initiate engagement of the lower ratio of the auxiliary gearing and in the other condition to initiate engagement of the higher ratio of the auxiliary gearing, the bi-stable switching device being arranged to be changed from one condition to the other whenever the second sensing means senses that the main clutch control is in its second position and the first sensing means simultaneously senses that the highest ratio of the main gearing has already been selected, so that whenever the main gearing is in its highest ratio the only action required to change the operative ratio of the auxiliary gearing is the movement of the main clutch control to its second position, each said movement of the main clutch control to its second position actuating the ratio control means to change the operative ratio of the auxiliary gearing while simultaneously disengaging the main clutch.

6. The combination in a motor vehicle of a prime mover; a multi-speed main gearing provided with a manual ratio selector means movable from a neutral position to any one of a number of operative positions equal to the number of ratios available in said main gearing but having no other operative positions; a disengageable main clutch between the prime mover and the input to the main gearing; a driver operated main clutch control having a first position in which the main clutch is engaged to transmit drive from the prime mover to the main gearing and a second position in which the main clutch is disengaged and which is normally assumed during ratio changes of the main gearing by said selector means; an auxiliary two ratio gearing in series with the main gearing, and ratio control means for the auxiliary gearing and operable in dependence solely on the positions of the main clutch control and the manual ratio selector means, said ratio control means including (1) an electrical circuit including a first switch which is connected with the manual ratio selector means and arranged to sense when the highest ratio of the main gearing is selected, (2) a second switch connected with the main clutch control and arranged to sense when the main clutch control is moved to its second position, and (3) a bi-stable switching device which is arranged when in one condition to initiate engagement of the lower ratio of the auxiliary gearing and in the other condition to initiate engagement of the higher ratio of the auxiliary gearing, the bi-stable switching device being arranged to be changed from one condition to the other whenever the second switch senses that the main clutch is in its second position and the first switch simultaneously senses that the highest ratio of the main gearing has already been selected, so that whenever the main gearing is in its highest ratio, the only action required to change the operative ratio of the auxiliary gearing is the movement of the main clutch control to its second position, each said movement of the main clutch control to its second position actuating the ratio control means to change the operative ratio of the auxiliary gearing while simultaneously disengaging the main clutch.

7. A combination according to claim 6 in which power is supplied to the circuit via the first switch which is closed only when the highest ratio of the main gearing is selected, the bi-stable switching device comprises a relay, the second switch is a double pole switch one part of which is arranged to momentarily connect the relay to the power supply when the main clutch control is moved to its second position and the first switch is also closed thus activating the relay and initiating engagement of the higher ratio of the auxiliary gearing, and the circuit also includes a holding sub-circuit arranged to maintain the relay activated following such a momentary connection to the power supply until the relay is de-activated through part of the circuit including the other part of the double pole switch on a subsequent movement of the main clutch control to its second position thereby engaging the lower ratio of the auxiliary gearing.

* * * * *